(12) United States Patent
Maruyama et al.

(10) Patent No.: US 9,079,477 B2
(45) Date of Patent: Jul. 14, 2015

(54) VEHICLE DOOR STRUCTURE

(75) Inventors: Katsuya Maruyama, Kariya (JP); Yoshio Ojima, Kariya (JP); Taketo Fukuhara, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 0 days.

(21) Appl. No.: 14/361,091

(22) PCT Filed: Jul. 24, 2012

(86) PCT No.: PCT/JP2012/068702
§ 371 (c)(1),
(2), (4) Date: May 28, 2014

(87) PCT Pub. No.: WO2013/080602
PCT Pub. Date: Jun. 6, 2013

(65) Prior Publication Data
US 2014/0292022 A1  Oct. 2, 2014

(30) Foreign Application Priority Data
Nov. 29, 2011 (JP) ................................ 2011-260764

(51) Int. Cl.
*B60J 5/00* (2006.01)
*B60J 5/04* (2006.01)
*B60J 5/06* (2006.01)

(52) U.S. Cl.
CPC ................ *B60J 5/047* (2013.01); *B60J 5/0479* (2013.01); *B60J 5/06* (2013.01)

(58) Field of Classification Search
USPC ............................................ 296/155, 146.11
See application file for complete search history.

(56) References Cited

U.S. PATENT DOCUMENTS

| 6,637,764 B2 * | 10/2003 | Novakowski ................. 280/504 |
| 7,878,575 B1 * | 2/2011 | Wall et al. ..................... 296/155 |
| 2006/0197357 A1 | 9/2006 | Catania |

FOREIGN PATENT DOCUMENTS

| FR | 2818591 A1 | 6/2002 |
| JP | 57180072 U | 11/1982 |
| JP | 59003977 U | 1/1984 |
| JP | 63-42779 U | 3/1988 |
| JP | 2-53482 U | 4/1990 |

(Continued)

OTHER PUBLICATIONS

International Preliminary Report on Patentability dated Jul. 10, 2014, issued by the International Searching Authority in corresponding International Application No. PCT/JP2012/068702.

(Continued)

*Primary Examiner* — Joseph D Pape
(74) *Attorney, Agent, or Firm* — Sughrue Mion, PLLC

(57) ABSTRACT

A vehicle door panel, which can prevent a slide-openable door panel from deviating from a swing-openable door panel when the swing-openable door panel is opened, is provided. The vehicle door structure 10 includes a slide door panel 14, a swing door panel 16, a slide mechanism 18 and a hinge mechanism 20, and includes a lock mechanism 22 for locking the slide door panel 14 to the swing door panel 16 when the swing door panel 16 is opened. The lock mechanism 22 is configured by a locking portion 50 installed in the swing door panel 16 and protruding toward the slide door panel 16 when the swing door panel 16 is opened, and an opening portion 60 installed in the slide door panel 14 and locked by the locking portion 50 when the swing door panel 16 is opened.

6 Claims, 15 Drawing Sheets

(56) References Cited

FOREIGN PATENT DOCUMENTS

| | | |
|---|---|---|
| JP | 4-76885 U | 7/1992 |
| JP | 07010317 U | 2/1995 |
| JP | 08270321 A | 10/1996 |
| JP | 11278142 A | 10/1999 |
| JP | 2002127807 A | 5/2002 |
| JP | 2006240611 A | 9/2006 |
| JP | 2011046271 A | 3/2011 |
| JP | 2012081797 A | 4/2012 |
| WO | 2005108192 A1 | 11/2005 |
| WO | 2011024767 A1 | 3/2011 |

OTHER PUBLICATIONS

Communication dated Mar. 11, 2015 from the European Patent Office in counterpart European Application No. 12854068.9.

* cited by examiner

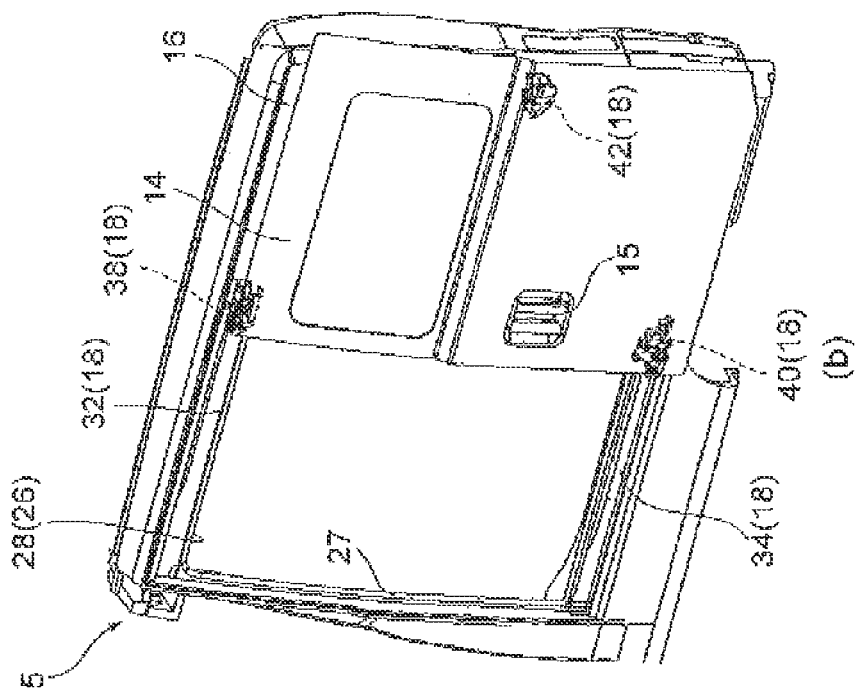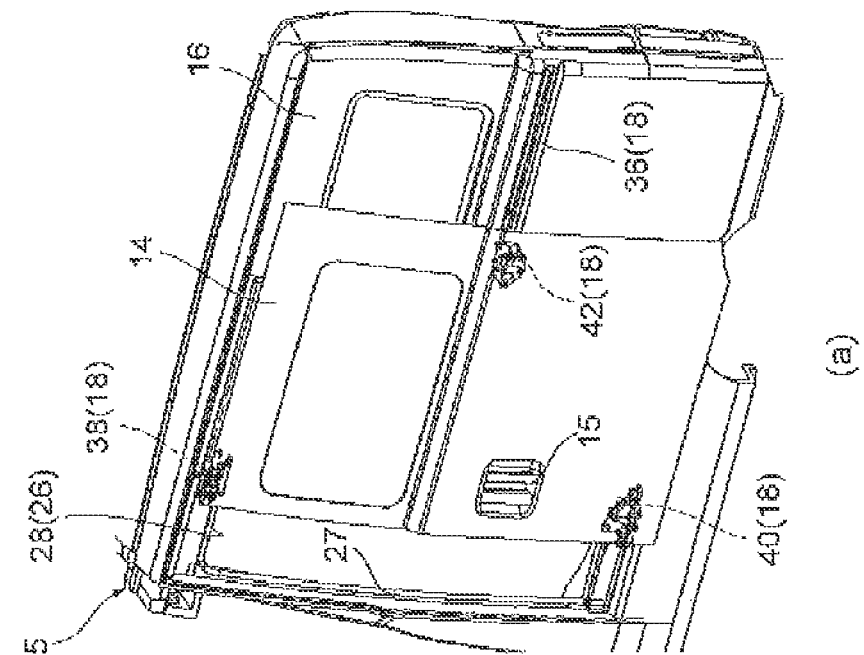
Fig.2

Fig.13
(a)
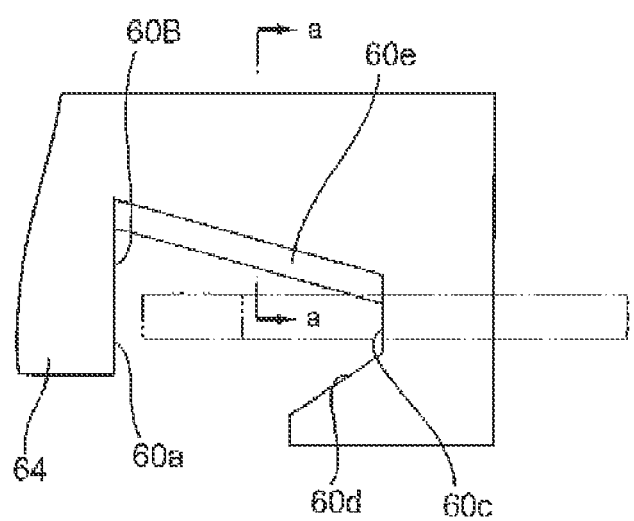
(b)
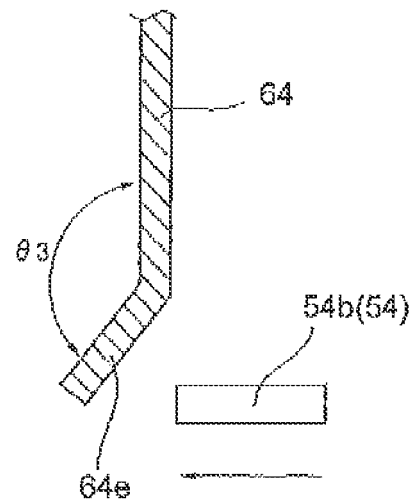

VEHICLE DOOR STRUCTURE

CROSS REFERENCE TO RELATED APPLICATIONS

This application is a National Stage of International Application No. PCT/JP2012/068702 filed Jul. 24, 2012, claiming priority based on Japanese Patent Application No. 2011-260764 filed Nov. 29, 2011, the contents of all of which are incorporated herein by reference in their entirety.

TECHNICAL FIELD

The present invention relates to a vehicle door structure, and more particularly, to a vehicle door structure having a compound door panel in which a slide-openable door panel and a swing-openable door panel are combined.

BACKGROUND ART

For example, a vehicle door structure disclosed in Patent Literature 1 has been known as a vehicle door structure. The vehicle door structure disclosed in Patent Literature 1 has a first door panel and a second door panel, the first door panel is configured to be slidable with respect to a vehicle body and the second door panel, and at the same time, the second door panel is configured to be swingable with respect to the vehicle body. Further, in the vehicle door structure according to the related art, in order to improve stability for slide opening/closing of a slide-openable door panel, when the slide opening/closing of the slide-openable door panel is performed, the slide-openable door panel is supported by a vehicle, and when the slide-openable door panel is fully opened, the supporting of the slide-openable door panel by the vehicle is released.

CITATION LIST

Patent Literature

Japanese Patent Laid-Open Publication No. 2006-240611

SUMMARY OF INVENTION

Technical Problem

As described above, in a vehicle door structure in which a slide-openable door panel is supported by a vehicle when the slide-openable door panel is opened or closed, in order to consider safety for opening and closing of a swing-openable door panel, and in order to reduce a load with respect to a swing member which swings the swing-openable door panel, when the swing-openable door panel is opened, it is preferred that the slide-openable door panel is maintained in an overlapping state with respect to the swing-openable door panel. However, in this structure, since a handle of the slide-openable door panel is manipulable, when the handle of the slide-openable door panel is incorrectly manipulated in a state in which the swing-openable door panel is opened, fixing between the slide-openable door panel and the swing-openable door panel is released. Accordingly, it is concerned that the slide-openable door panel is not supported by the vehicle, and the slide-openable door panel deviates from the swing-openable door panel.

The present invention is conceived to solve the aforementioned problems, and an aspect of the present invention is to provide a vehicle door structure in which the slide-openable door panel can be prevented from deviating from the swing-openable door panel when the swing-openable door panel is opened.

Solution to Problem

In order to solve the above problem, a vehicle door structure according to the present invention is provided. The vehicle door structure includes: a first door panel arranged in a first opening portion installed in a vehicle body, to open and close the corresponding first opening portion; a second door panel arranged in a second opening portion continuously arranged with the first opening portion side by side, to open and close the corresponding second opening portion; a slide mechanism configured to mount the first door panel slidably with respect to the vehicle body and the second door panel, and move the first door panel between a closed position where the first opening portion is closed and an opened position where the first opening portion is fully opened and the first door panel overlaps the second door panel at the same time; and a swing mechanism configured to support the second door panel swingably with respect to the vehicle body and allow the second door panel to swing when the first door panel is in the opened position, wherein the vehicle door structure includes a locking mechanism configured to lock the first door panel to the second door panel when the second door panel is opened, and the locking mechanism is configured by a locking portion installed in the second door panel and protruding toward the first door panel when the corresponding second door panel is opened, and a portion to be locked, installed in the first door panel and locked by the locking portion when the second door panel is opened.

The vehicle door panel includes the locking mechanism configured to lock the first door panel to the second door panel when the second door panel is opened, and the locking mechanism is configured by the locking portion protruding toward the first door panel when the second door panel is opened, and the portion to be locked, installed in the first door panel. Accordingly, when the second door panel is opened, the portion of the first door panel to be locked is locked by the locking portion of the second door panel. Therefore, in the vehicle door panel, since movement of the first door panel is restrained when the second door panel is opened, the slide-openable first door panel can be prevented from deviating from the swing-openable second door panel.

The locking portion includes a contact member in contact with the vehicle body at the closed position of the second door panel where the second opening portion is closed by the second door panel, a locking member rotatably supported by the second door panel and rotating while interlocking with the contact member, and a resilient support member configured to resiliently support the locking member in a direction in which the corresponding locking member rotates, and when the contact member is spaced apart from the vehicle body, the locking member protrudes toward the first door panel while being rotated. In such a configuration, when the second door panel is opened, the locking member automatically protrudes toward the first door panel while being rotated. Thus, when the second door panel is opened, the portion to be locked can be favorably locked by the locking portion.

The locking member includes a protrusion portion configured by a contact member in contact with the vehicle body at the closed position of the second door panel where the second opening portion is closed by the second door panel, and a locking member integrally formed with the contact member and extending in the same direction as that of the contact member at the same time; and a resilient support member configured to resiliently support the protrusion portion toward the first door panel, and wherein when the contact member is spaced apart from the vehicle body, the protrusion portion may protrude toward the first door panel. In such a configuration, when the second door panel is opened, the protrusion portion automatically protrudes toward the first door panel. Thus, when the second door panel is opened, the portion to be locked can be favorably locked by the locking portion.

The portion to be locked corresponds to an opening portion, and may have a shape in which an opening thereof is continuously narrowed as the locking member rotates while the locking member enters. Accordingly, when the locking member enters the portion to be locked, since the opening of the portion to be locked is wide, the locking member easily enters the portion to be locked. Further, since the opening of the portion to be locked is narrow at a location where the locking member and the portion to be locked are engaged with each other by being in contact with each other, even when the first door panel moves in the vertical direction, the locking member can be prevented from deviating from the portion to be locked. Thus, when the second door panel is opened, the portion to be locked can be favorably locked by the locking portion.

When the first door panel is in the opened position, a restriction member, configured to restrain movement of the corresponding first door panel in a vertical direction of the vehicle body, may be installed in the second door panel. In this way, a height location of the first door panel is maintained to be within a predetermined range by the restriction member configured to restrain the movement of the first door panel in the vertical direction. Accordingly, since a predetermined location relation between the locking portion and the portion to be locked is maintained, the locking portion and the portion to be locked may be more surely engaged with each other.

A guide portion configured to correct the height location of the first door panel may be installed at a portion of the restriction member where the first door panel is to enter. By such a configuration, as the first door panel enters along the guide portion, the height location of the first door panel is gradually corrected to a predetermined height location. Thus, unevenness of the height location in the vertical direction of the first door panel entering the restriction member can be corrected by the guide portion.

Advantageous Effects of Invention

In accordance with the present invention, a slide-openable door panel can be prevented from deviating from a swing-openable door panel when the swing-openable door panel is opened.

BRIEF DESCRIPTION OF DRAWINGS

FIG. 2(a) is a perspective view illustrating a state in which a slide door panel is being opened, and FIG. 2(b) is a perspective view illustrating a state in which the slide door panel is in an opened position;

FIG. 13 illustrates an opening portion according to another form;

DESCRIPTION OF EMBODIMENTS

Figure 1:
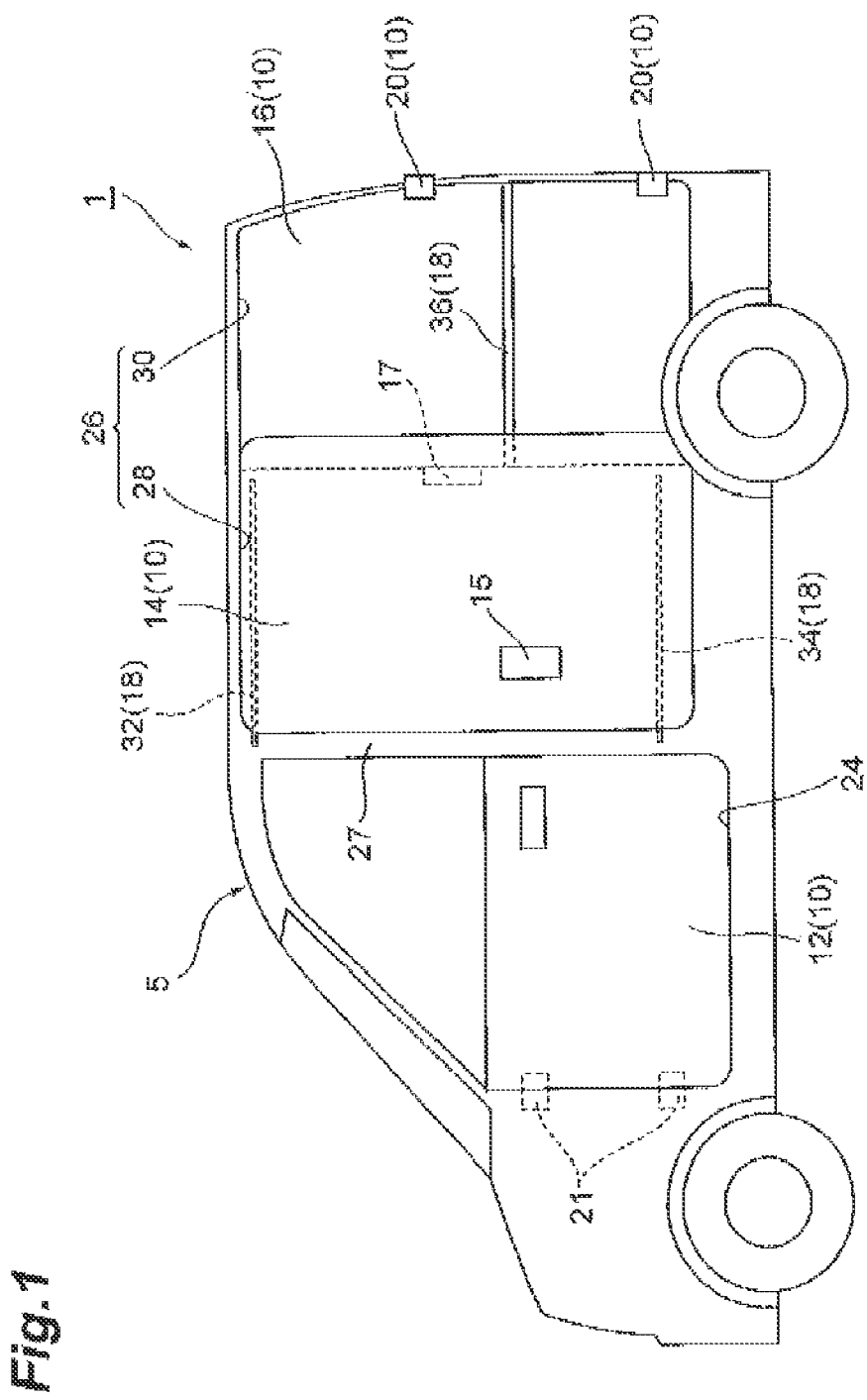
FIG. 1 is a side view illustrating a vehicle body to which a vehicle door structure according to an embodiment is applied.

Hereinafter, a suitable embodiment of the present invention will be described in detail with reference to the accompanying drawings. Meanwhile, in the description of the drawings, the same portions or the equivalent portions are designated by the same reference numerals, and a duplicate description will be omitted.

FIG. 1 is a side view illustrating a vehicle body to which a vehicle door structure according to an embodiment is applied. Meanwhile, in the following description, the terms "front", "rear", "upper", "lower", etc. may be used. The terms "front", "rear", "upper" and "lower" correspond to a front side, a rear side, an upper side and a lower side of a vehicle (car).

A vehicle 1 illustrated in FIG. 1 corresponds to, for example, a minivan to which a vehicle door structure 10 according to an embodiment is applied. In the following description, an example where the vehicle door structure is applied to a side surface (left surface) of the vehicle 1 illustrated in FIG. 1 will be described. Further, the same configuration may be installed in the other side surface.

Figure 3:
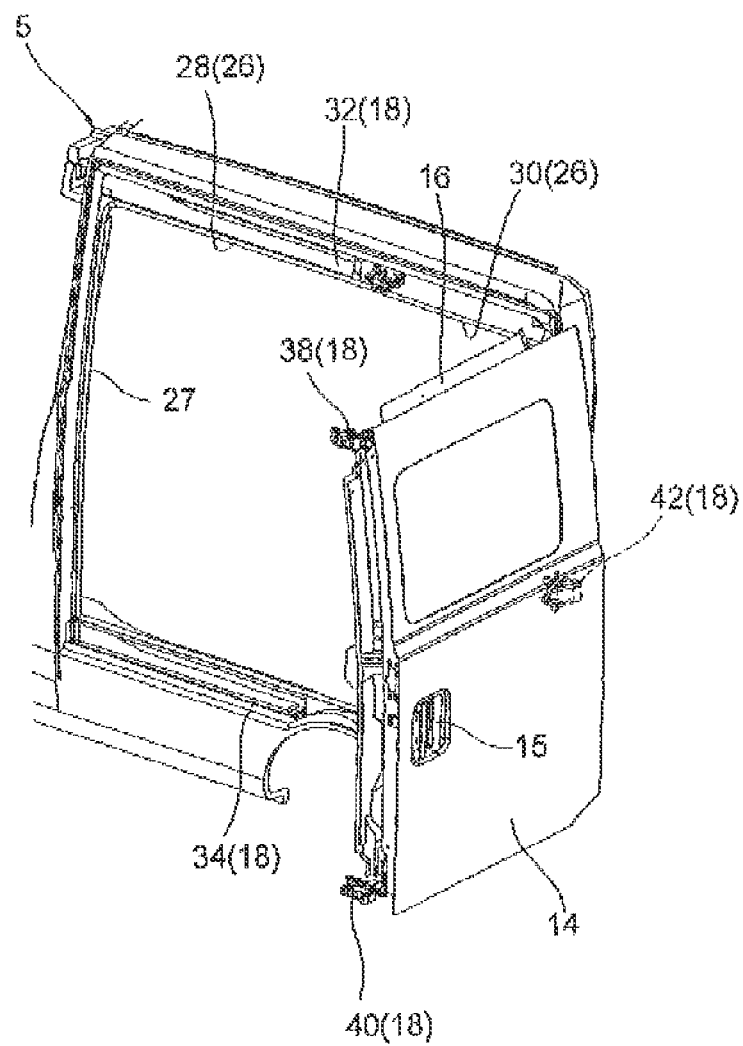
FIG. 3 is a perspective view illustrating a state in which a swing door panel in the vehicle door panel is opened.
Figure 4:
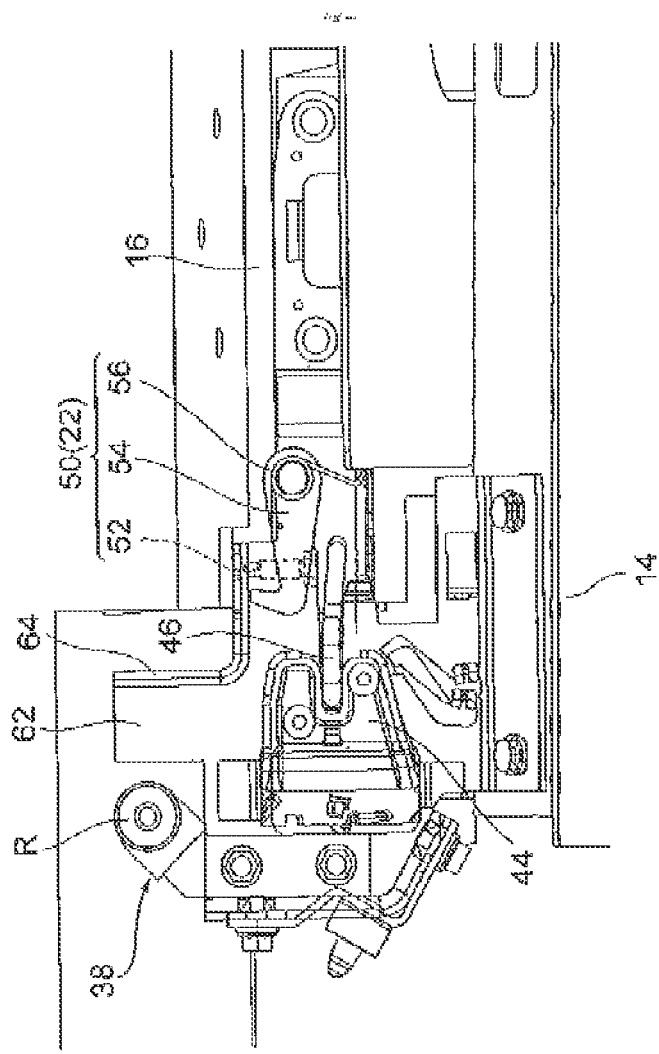
FIG. 4 illustrates a state in which the slide door panel and the swing door panel are combined, when viewed from above.

FIG. 2(a) is a perspective view illustrating a state in which a slide door panel is being opened, and FIG. 2(b) is a perspective view illustrating a state in which the slide door panel is in an opened position. FIG. 3 is a perspective view illustrating a state in which a swing door panel in the vehicle door panel is opened. FIG. 4 illustrates a state in which the slide door panel and the swing door panel are combined, when viewed from above.

As illustrated in each of the drawings, the vehicle door structure 10 includes a front door panel 12, a slide door panel (first door panel) 14, a swing door panel (second door panel) 16, a slide mechanism (sliding mechanism) 18, a hinge mechanism (swing mechanism) 20 and a lock mechanism (locking mechanism) 22.

Firstly, a front opening portion 24 in which the front door panel 12 is arranged, and a rear opening portion 26 in which the slide door panel 14 and the swing door panel 16 is arranged will be described.

The front opening portion 24 and the rear opening portion 26 are installed at a side surface of a vehicle body 5. The front opening portion 24 is installed at a front side of the vehicle body 5, for example, a place where getting in or out of a driver's seat or a passenger's seat is performed. The front door panel 12 corresponds to a door panel for opening and closing the front opening portion 24, and is installed to be swingable with respect to the vehicle body 5 by the hinge mechanism 21.

The rear opening portion 26 is installed at a rear side of the vehicle body 5, for example, a place where getting in or out of a rear seat or loading/unloading of baggage in/from a trunk is performed. The rear opening portion 26 is partitioned from the front opening portion 24 by a pillar 27. The rear opening portion 26 is configured by a first opening portion 28 and a second opening portion 30. The first opening portion 28 and the second opening portion 30 are continuously arranged side by side in the front-rear direction of the vehicle body 5. The first opening portion 28 is installed at a front side of the vehicle body 5 with respect to the rear opening portion 26, and the second opening portion 30 is installed at a rear side of the vehicle body 5 with respect to the rear opening portion 26.

The slide door panel 14 is arranged in the first opening portion 28. The slide door panel 14 corresponds to a door panel for opening and closing the first opening portion 28. The slide door panel 14 is installed to be slidable in the front-rear direction with respect to the vehicle body 5 and the swing door panel 16 by the slide mechanism 18. A handle 15 is installed in the slide door panel 14, and the slide door panel 14 is opened and closed by manipulating the handle 15.

The swing door panel 16 is arranged in the second opening portion 30. The swing door panel 16 corresponds to a door panel for opening and closing the second opening portion 30. The swing door panel 16 is installed to be swingable with respect to the vehicle body 5 by the hinge mechanism 20. A handle 17 is installed in the swing door panel 16, and the swing door panel 16 is opened and closed by manipulating the handle 17. The entirety of the rear opening portion 26 is opened and closed by the slide door panel 14 and the swing door panel 16.

The slide mechanism 18 corresponds to a mechanism which mounts the slide door panel 14 slidably with respect to the vehicle body 5, and moves the slide door panel 14 between a closed position, in which the first opening portion 28 is closed, and an opened position, in which the first opening portion 28 is fully opened and the slide door panel 14 overlaps the swing door panel 16 at the same time. The slide mechanism 18 is configured by an upper slide rail 32, a lower slide rail 34, a middle slide rail 36, an upper slide portion 38, a lower slide portion 40 and a middle slide portion 42.

The upper slide rail 32 is disposed in an upper portion (roof side rail) of the vehicle body 5 with respect to the first opening portion 28. The upper slide rail 32 extends along the front-rear direction of the vehicle body 5. The lower slide rail 34 is disposed in a lower portion (bottom side) of the vehicle body 5 with respect to the first opening portion 28. The lower slide rail 34 extends along the front-rear direction of the vehicle body 5.

The middle slide rail 36 is disposed on an outer surface of the swing door panel 16. The middle slide rail 36 is disposed at an approximately central portion of the height direction of the vehicle body 5 with respect to the swing door panel 16. The middle slide rail 36 extends along the front-rear direction of the vehicle body 5.

The upper slide portion 38, the lower slide portion 40 and the middle slide portion 42 are installed in the slide door panel 14. As illustrated in FIG. 2, the upper slide portion 38 is disposed at an upper portion of a front end side of the slide door panel 14. The lower slide portion 40 is disposed at a lower portion of the front end side of the slide door panel 14. The middle slide portion 42 is disposed at an approximately central portion of the height direction of the front end side of the slide door panel 14.

The upper slide portion 38 is configured to have a roller R. Further, likewise, the lower slide portion 40 and the middle slide portion 42 are also configured to have rollers which are not illustrated. The slide door panel 14 is configured to be slidable with respect to the vehicle body 5 and the swing door panel 16 by sliding the rollers R in a state in which the rollers R are guided to the upper slide rail 32, the lower slide rail 34 and the middle slide rail 36.

By the slide mechanism 18 having such a configuration, the slide door panel 14 is configured to be movable in the front-rear direction of the vehicle between the closed position, in which the first opening portion 28 is closed, and the opened position (FIG. 2(b)), in which the first opening portion 28 is fully opened and the slide door panel 14 is located at an outer side of the swing door panel 16 and overlaps the swing door panel 16 at the same time.

In detail, in the slide door panel 14 in the closed position, the upper, lower and middle slide portions 38, 40 and 42 are guided to the upper, lower and middle slide rails 32, 34 and 36. Further, in the slide door panel 14 in the opened position, the upper and lower slide portion 38 and 40 deviate from the upper and lower slide rails 32 and 34 (See FIG. 3), and only the middle slide portion 42 is guided to the middle slide rail 36.

The hinge mechanism 20 is installed at a rear side of the second opening portion 30 (the rear opening portion 26). A pair of hinge mechanisms 20 are disposed to be spaced apart from each other in the vertical direction of the vehicle body 5. By the hinge mechanisms 20, the swing door panel 16 is supported to be swingable with respect to the vehicle body 5, and is opened and closed by swinging about an axis along the vertical direction of the vehicle body 5.

The slide door panel 14 in the opened position is fixed to the swing door panel 16. As illustrated in FIG. 4, a latch 44 is installed in a base 62 mounted to the slide door panel 14, and a door panel lock striker 46 is installed in the swing door panel 16. In the vehicle door structure 10, when the slide door panel 14 reaches the opened position (position where the rollers R of the upper and lower slide portion 38 and 40 deviate from the upper and lower slide rail 32 and 34), the latch 44 of the slide door panel 14 is connected to the door panel lock striker 46. Accordingly, in the vehicle door structure 10, the slide door panel 14 and the swing door panel 16 are fixed.

Herein, the connection between the latch 44 of the slide door panel 14 and the door panel lock striker 46 can be released by manipulating the handle 15 of the slide door panel 14. Therefore, in the vehicle door structure 10, when the swing door panel 16 is opened, even when the slide door panel 14 and the swing door panel 16 are fixed, in a case where the handle 15 of the slide door panel is incorrectly manipulated, the fixing between the latch 44 and the door panel lock striker 46 is released so that the slide door panel 14 becomes slidable. At this time, in the vehicle door structure 10, when the slide door panel 14 is slid toward a front side of the vehicle body 5 with respect to the swing door panel 16, there is a concern that the middle slide portion 42 deviates from the middle slide rail 36, and the slide door panel 14 deviates from the swing door panel 16.

Thus, the vehicle door structure 10 includes the lock mechanism 22. The lock mechanism 22 corresponds to a mechanism, which is installed separately from the latch 44 and the door panel lock striker 46 which are described above and locks the slide door panel 14 to the swing door panel 16 when the swing door panel 16 is opened.

Figure 5:
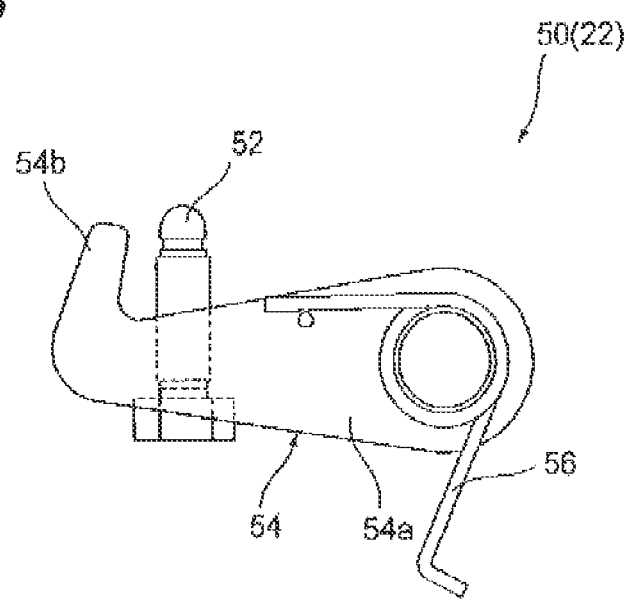
FIG. 5 illustrates a locking portion.
Figure 6:
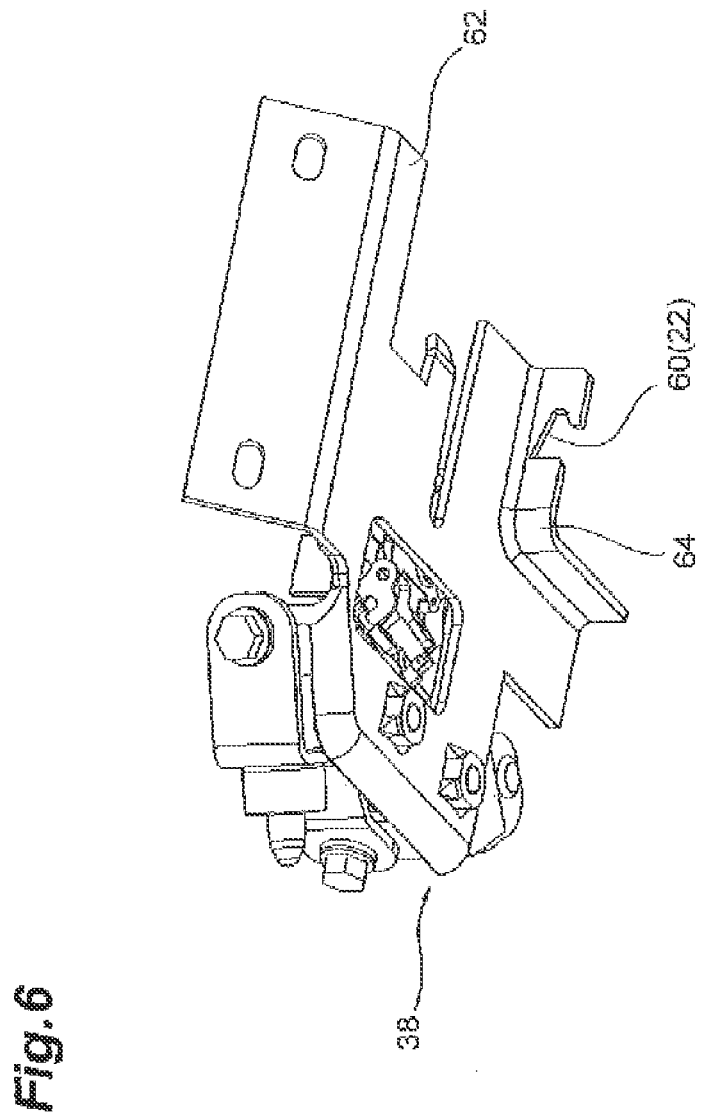
FIG. 6 is a perspective view illustrating a base in which an upper slide portion and a latch are mounted, when viewed from below.

FIG. 5 illustrates a locking portion. FIG. 6 is a perspective view illustrating a base, in which an upper slide portion and a latch are mounted, when viewed from below.

As illustrated in FIGS. 5 and 6, the lock mechanism 22 is configured by a locking portion 50 installed in the swing door panel 16 and an opening portion 60 (portion to be locked) installed in the slide door panel 14. The locking portion 50 is installed at an upper end of a front side of the swing door panel 16. The locking portion 50 includes a detection pin (contact member) 52, a swing hook (locking member) 54 and a spring (resilient support member) 56.

The detection pin 52 corresponds to a portion which is in contact with a body surface 5a of the vehicle body 5 when the swing door panel 16 is in a closed state. The detection pin 52 has an approximately cylindrical portion, and is disposed at a location where a distal end thereof is in contact with the body surface 5a of the vehicle body 5. That is, the detection pin 52 is spaced apart from the body surface 5a of the vehicle body 5 when the swing door panel 16 is opened.

The swing hook 54 corresponds to a member for locking the opening portion 60. The swing hood 52 has an L-shape, and is configured by a base portion 54a and a hook portion 54b installed at an end of the base portion 54a. The base portion 54a has a tapered shape which is tapered to one end thereof from the other end thereof.

A shaft center of the other end of the base portion 54a is pivotally supported by a shaft along the vertical direction of the vehicle body 5. Accordingly, the swing hook 54 is installed to be rotatable along a horizontal plane with respect to the shaft center. The swing hook 54 is connected to the detection pin 52 by a not-illustrated connection member, and operates together with the detection pin 52. That is, the swing hook 54 rotates while interlocking with the operation of the detection pin 52. The hook portion 54b corresponds to a portion in contact with the opening portion 60, and is installed to extend toward the vehicle body 5. A distal end of the hook portion 54b is shorter than the distal end of the detection pin 52. Further, the detection pin 52 is connected at a location closer to the shaft center than the hook portion 54b.

The spring 56 corresponds to a member for resiliently supporting the swing hook 54 in a direction in which the swing hook 54 rotates, and resiliently supports the swing hook 54 toward the body surface 5a of the vehicle body 5. The spring 56 corresponds to, for example, a torsion spring, and is arranged at the other end of the base portion 54a of the swing hook 54. By the spring 56, the swing hook 54 is resiliently supported to always rotate in a clockwise direction.

By such a configuration, in the locking portion 50, when the swing door panel 16 is opened, the detection pin 52 becomes spaced apart from the body surface 5a of the vehicle 5, and the swing hook 54 rotates toward the vehicle body 5 by an energized force of the spring 56 at the same time. That is, in the locking portion 50, when the swing door panel 16 is opened, the swing hook 54 automatically protrudes toward a bracket 64 of the slide door panel 14, that is, toward the vehicle body 5.

Figure 7:
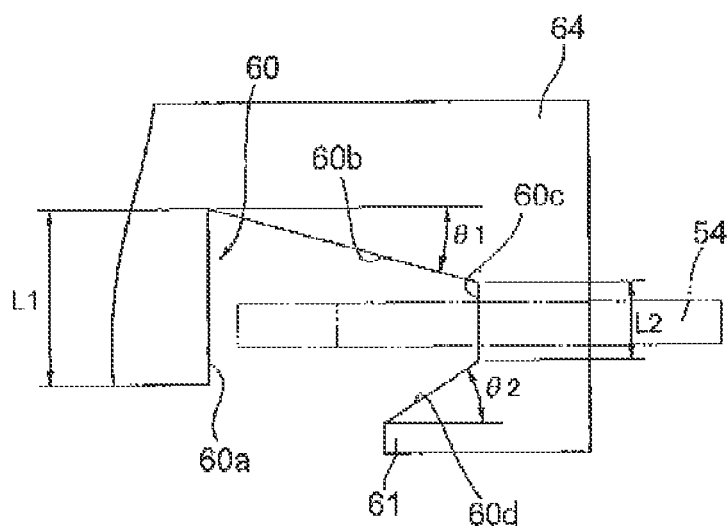
FIG. 7 illustrates an opening portion.

The opening portion 60 is installed in the bracket 64 of the base 62. The base 62 is fixed to the slide door panel 14, and has the upper slide portion 38, the latch 44 or the like mounted thereto. The bracket 64 extends downward from a bottom surface of the base 62, and has an L-shape. FIG. 7 illustrates an opening portion. As illustrated in FIG. 7, the opening portion 60 has an approximately trapezoidal shape, and is opened toward a lower side of the bracket 64.

In a connection state between the door panel lock striker 46 of the swing door panel 16 and the latch 44 of the slide door panel 14, the opening portion 60 is disposed at a vehicle body 5 side of the hook portion 54b of the swing hook 54. That is, the opening portion 60 is installed on a trajectory of the hook portion 54b when the swing hook 54 rotates.

The opening portion 60 has a shape in which an opening thereof is continuously narrowed as the swing hook 54 enters and rotates. A boundary of the opening portion 60 is defined by a first surface 60a, a second surface 60b, a third surface 60c and a fourth surface 60d. The first surface 60a and the third surface 60c face each other, and are formed along a height direction of the vehicle body 5. A dimension L1 of the first surface 60a is larger than a dimension L2 of the second surface 60b (L1>L2). Further, the dimension L2 of the second surface 60b is larger than a thickness of the swing hook 54. Further, the second surface 60b corresponds to a sloped surface which is sloped from the first surface 60a to the third surface 60c in a declivity form. Further, the fourth surface 60d corresponds to a sloped surface which is sloped from the third surface 60c to the first surface 60a in a declivity form.

When an angle between the second surface 60b and a horizontal direction (front-rear direction of the vehicle body 5) is referred to as θ1 and an angle between the fourth surface 60d and the horizontal direction is referred to as θ2, the opening portion 60 satisfies a relation of $0° \leq \theta1$ and $\theta2 \leq 45°$. By such a configuration, the opening portion 60 has a shape in which an opening thereof is narrowed as the swing hook 54 rotates. Further, in a portion in which the fourth surface 60d is formed, a bent portion 61 protruding from the third surface 60c toward the first surface 60a is formed in the bracket 64.

Figure 8:
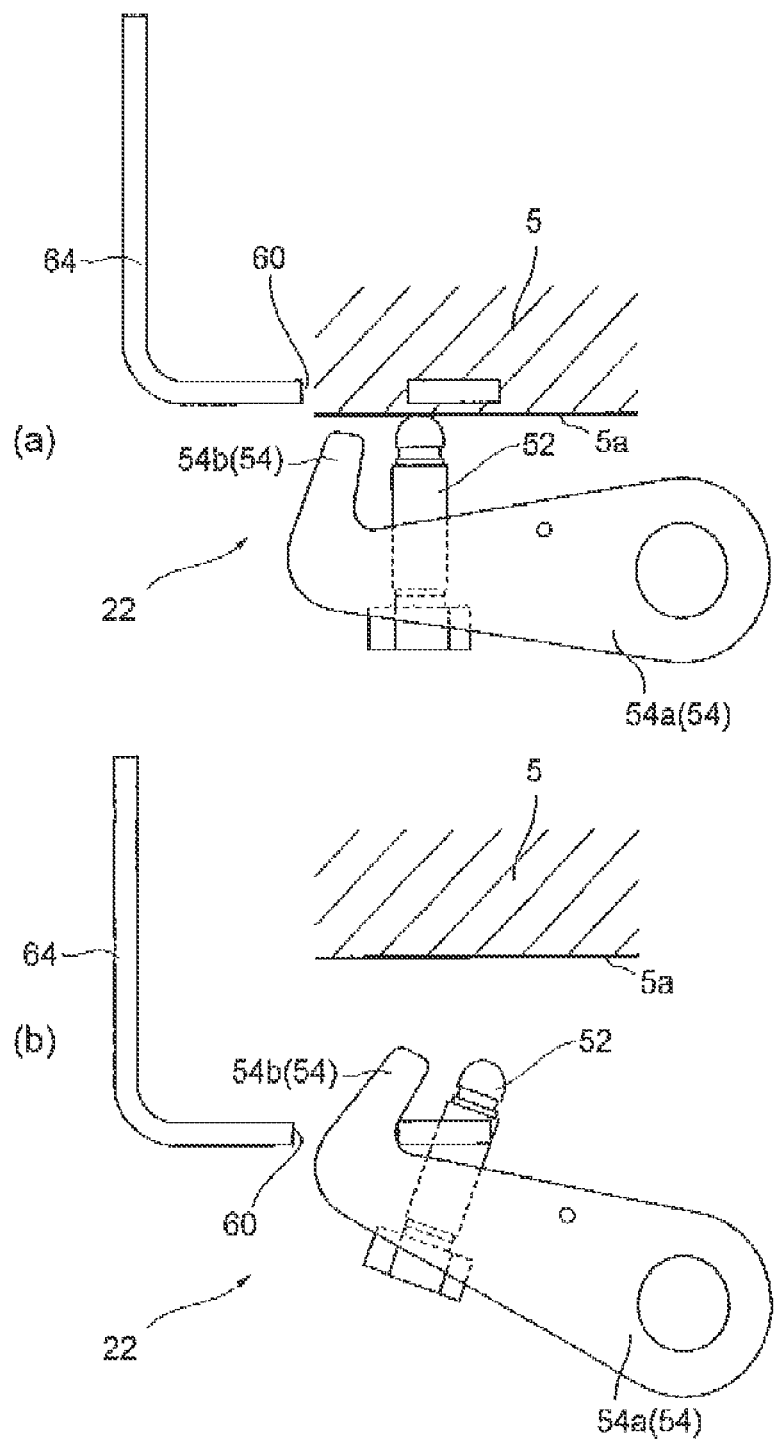
FIG. 8 illustrates an operation of a lock mechanism.

Subsequently, an operation of the lock mechanism 22 having the aforementioned configuration will be described with reference to FIG. 8. FIG. 8 illustrates an operation of a lock mechanism. When the slide door panel 14 is in the opened position, that is, in a state in which the latch 44 of the slide door panel 14 and the door panel lock striker 4 of the swing door panel 16 are connected to each other, the detection pin 52 is in contact with the body surface 5a of the vehicle body 5 as illustrated in FIG. 8A.

When the swing door panel 16 is opened from this state, as illustrated in FIG. 8B, the detection pin 52 becomes spaced apart from the body surface 5a of the vehicle body 5. At this time, the swing hook 54 interlocking with the detection pin 52 rotates in a clockwise direction by energization of the spring 56, and the hook portion 54b protrudes toward the slide door panel 14, that is, toward the bracket 64 of the base 62. Further, in the vehicle door structure 10, the hook portion 54b locks the opening portion 60 of the bracket 64 by making the swing hook 54 enter the opening portion 60.

Figure 9:
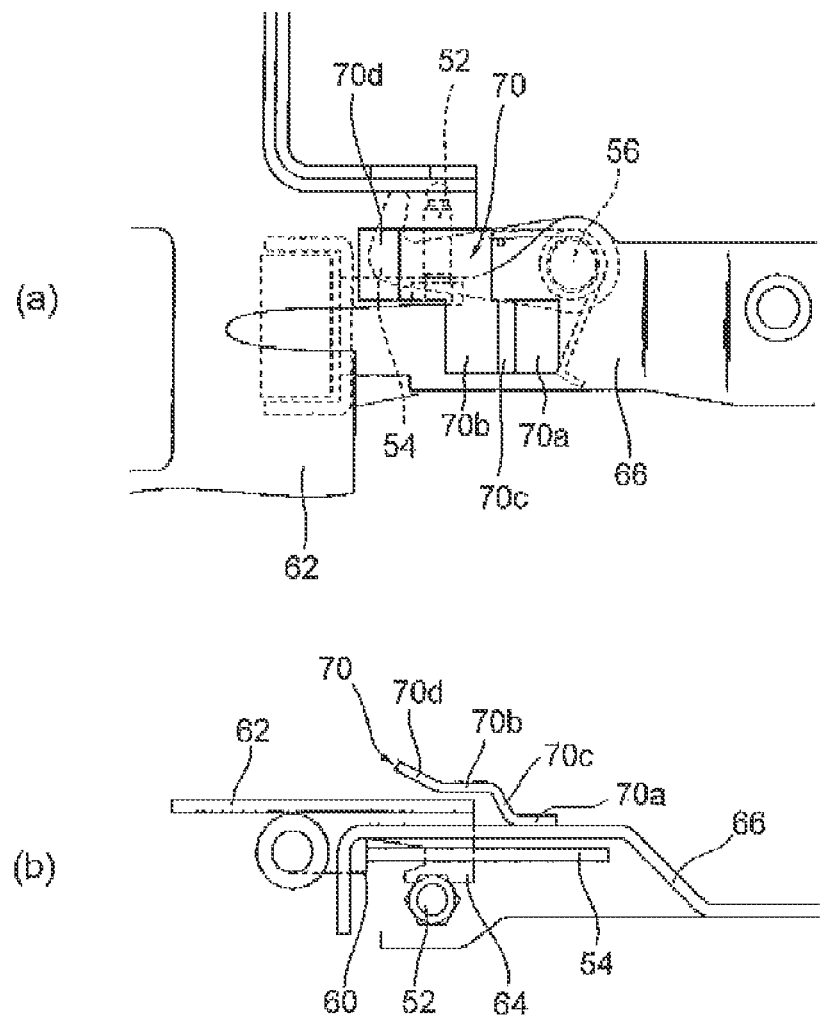
FIG. 9(a) illustrates a restriction member, when viewed from above.
FIG. 9(b) illustrates the restriction member, when viewed from the side.

Further, as illustrated in FIGS. 9(a) and 9(b), a restriction member 70 is arranged in the swing door panel 16. FIG. 9(a) illustrates a restriction member, when viewed from above, and FIG. 9(b) illustrates the restriction member, when viewed from the side. As illustrated in FIGS. 9(a) and 9(b), in the swing door panel 16, the restriction member 70 is disposed on a striker base 66. The restriction member 70 is formed by a plate-shaped member.

The restriction member 70 has a fixing portion 70a, a restriction portion 70b, a connection portion 70c and a guide portion 70d. The fixing portion 70a corresponds to a portion fixed to the striker base 66. The restriction portion 70b corresponds to a portion which is spaced above the fixing portion 70a, is disposed to be approximately parallel to the fixing portion 70a, and restrains movement in a vertical direction of the base 62 so as to restrain movement of the slide door panel 14 in a vertical direction. The connection portion 70c corresponds to a portion which stands upward from one end of the fixing portion 70a, and connects the fixing portion 70a and the restriction portion 70b with each other. The guide portion 70d is sloped upward from an end of the restriction portion 70b which is an entering portion of the base 62. In the restriction member 70, the fixing portion 70a, the restriction portion 70b, the connection portion 70c and the guide portion 70d are integrally formed by a sheet metal, etc.

Figure 10:
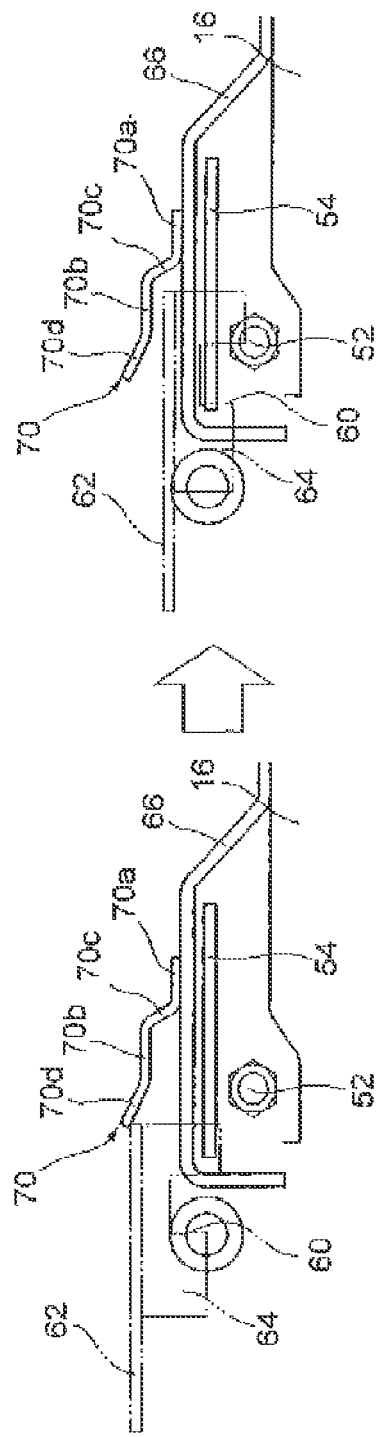
FIG. 10 illustrates a function of the restriction member.

In the restriction member 70, the guide portion 70d corresponds to a portion absorbing unevenness in a height direction of the base 62 entering the restriction member 70. FIG. 10 illustrates a function of the restriction member. As illustrated in FIG. 10, in the vehicle door structure 10, the slide door panel 14 moves toward the swing door panel 16. Further, when the latch 44 of the slide door panel 14 and the door panel lock striker 46 of the swing door panel 16 are coupled to each other, unevenness of a height location of the slide door panel 14 in a vertical direction may occur.

Thus, the restriction member 70 guides the base 62 (the slide door panel 14) to the restriction portion 70b set at a predetermined height location by making the base 62 be in contact with the guide portion 70d to slide the base 62 to the restriction portion 70b. A height location in a vertical direction of the base 62 guided to the restriction portion 70b is restrained to be within a predetermined range by the restriction portion 70b.

By the restriction member 70, movement in the vertical direction of the base 62 is restrained, and the base 62 is maintained at a predetermined height location. Accordingly, in the vehicle door structure 10, when the swing hook 54 rotates by opening the swing door panel 16, the opening portion 60 of the base 62 is surely located on a trajectory of the swing hook 54. Thus, in the vehicle door structure 10, the opening portion 60 can be more surely locked by the swing hook 54 so that the fixing between the slide door panel 14 and the swing door panel 16 can be more surely performed.

As described above, the vehicle door structure 10 according to the present embodiment includes the lock mechanism 22. The lock mechanism 22 is configured by the locking portion 50 installed in the swing door panel 16 and the opening portion installed in the slide door panel 14. The locking portion 50 has the swing hook 54 rotating toward the opening portion 60 when the detection pin 52 is spaced apart from the body surface 5a of the vehicle body 5.

By such a configuration, in the vehicle door structure 10, when the swing door panel 16 is opened, the swing hook 54 installed in the swing door panel 16 protrudes toward the bracket 64 of the slide door panel 14. At this time, the swing hook 54 locks the opening portion 60 formed in the bracket 64 of the slide door panel 14. Accordingly, when the swing door panel 16 is opened, the slide door panel 14 is fixed to the swing door panel 16. Thus, when the swing door panel 16 is opened, the slide door panel 14 is prevented from deviating from the swing door panel 16. As a result, safety can be secured.

Further, the opening portion 60 has an approximately trapezoidal shape, and has a shape in which an opening thereof is continuously narrowed as the swing hook 54 rotates. Accordingly, when the swing hook 54 enters the opening portion 60, since the opening of the opening portion 60 is wide, the swing hook 54 easily enters the opening portion 60. Further, at a location where the swing hook 54 and the opening portion 60 are engaged with each other by being in contact with each other, the opening of the opening portion 60 is narrow and the bent portion 61 is installed, so that even when the base 62 moves in the vertical direction, the swing hook 54 is prevented from deviating from the opening portion 60.

Further, in the vehicle door structure 10, when the slide door panel 14 is fixed to the swing door panel 16 by the restriction member 70, the movement in the vertical direction of the slide door panel 14 (the base 62) is restrained. Accordingly, since the height of the base 62 can be maintained such that the opening portion 60 is located on the trajectory of the swing hook 54, the swing hook 54 and the opening portion 60 can be more surely engaged with each other. Further, the swing hook 54 is prevented from deviating from the opening portion 60 by restraining the movement in the vertical direction of the base 62.

The present invention is not limited to the embodiments. For example, although it has been described in the embodiment as an example that the locking portion 50 is configured by the detection pin 52, the swing hook 54 and the spring 56, the locking portion may have a configuration illustrated in FIG. 11.

Figure 11:
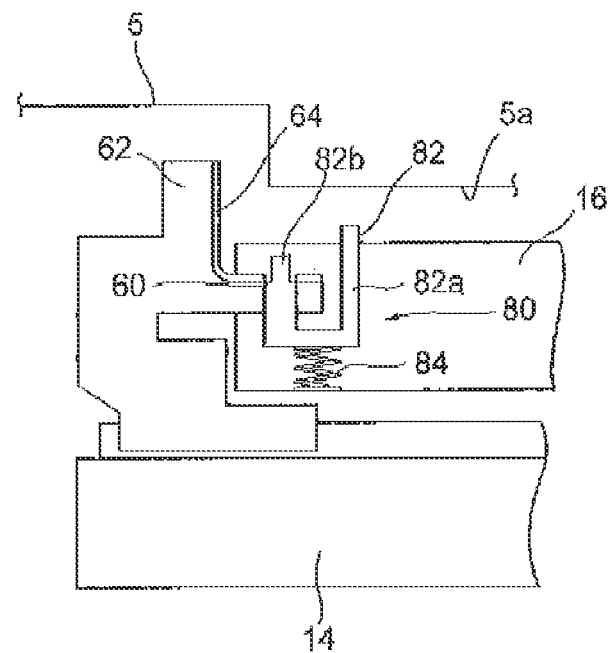
FIG. 11 illustrates a locking portion according to another form.

FIG. 11 illustrates a locking portion according to another form. As illustrated in FIG. 11, the locking portion 60 is configured by a protrusion portion 62 and a spring 84. The protrusion portion 82 has an approximately U shape when viewed from above, and has a detection point (contact member) 82a and a lock pin (formation member) 82b. The detection pin 82a and the lock pin 82b are stretched in the same direction, and a length dimension of the detection pin 82a is larger than a length dimension of the lock pin 82b. The spring 84 resiliently supports the protrusion portion 82 toward the bracket 64 of the slide door panel 14, that is, toward the vehicle body 5.

In the locking portion 50, when the detection pin 82a is spaced apart from the body surface 5a of the vehicle body 5, the lock pin 82b automatically protrudes toward the opening portion 60 of the slide door panel 14 while being resiliently supported by the spring 84.

Figure 12:
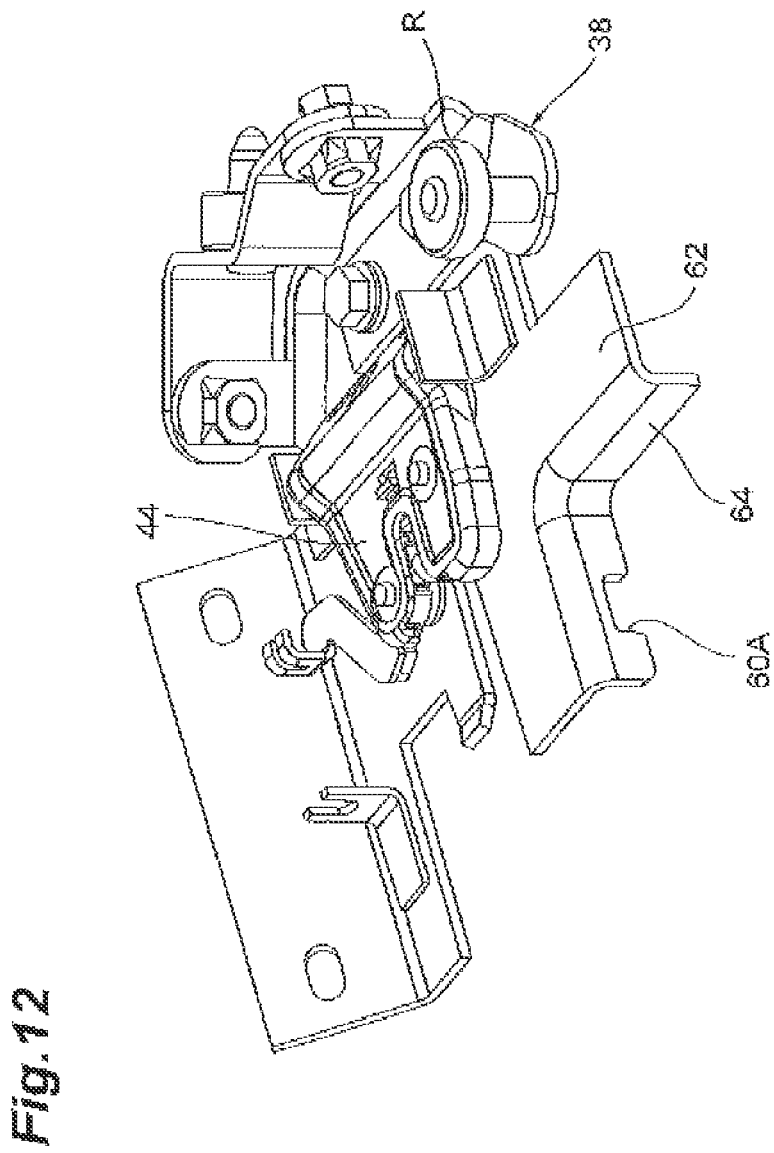
FIG. 12 illustrates an opening portion according to another form.

Further, although it has been described in the embodiment that the opening portion 60 in the lock mechanism 22 has the approximately trapezoidal shape, the shape of the opening portion 60 is not limited thereto. For example, as illustrated in FIG. 12, the opening portion 60A may have an approximately rectangular shape. Further, the opening portion may have a shape locked by the swing hook 54 or the lock pin 82b, or may be a penetration hole penetrating the bracket 64. Further, a shape of the penetration hole has an approximately trapezoidal shape. For example, the penetration hole should have a configuration in which the locking portion installed in the swing door panel 16 locks a portion to be locked, installed in the slide door panel 14.

Further, in addition to the embodiment, the opening portion 60 may have a configuration illustrated in FIG. 13. FIG. 13 illustrates an opening portion according to another form. As illustrated in FIG. 13, a guide portion 60e is installed in an opening portion 60B. The guide portion 60e protrudes downward toward a side opposite to the swing hook 54, that is, toward the vehicle body 5. When an angle formed between the bracket 64 and the guide portion 60e is referred to as θ3, a relation of 90°≤θ3≤140° is satisfied. By such a configuration, when the swing hook 54 enters, unevenness in a height direction of the swing hook 54 is corrected by the guide portion 60e. Thus, the swing hook 54 can be surely guided to the opening portion 60B.

Figure 14:
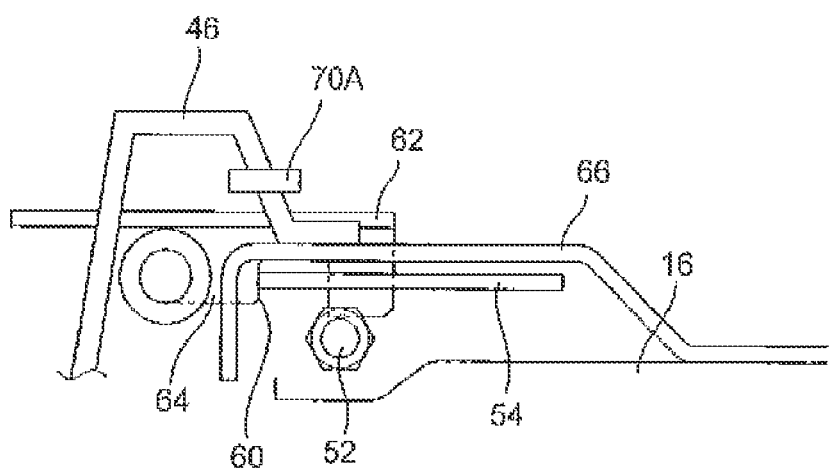
FIG. 14 illustrates a restriction member according to another form.

Further, although it has been described in the embodiment that the restriction member 70 is installed in the striker base 66, the restriction member may have a configuration illustrated in FIG. 14. FIG. 14 illustrates a restriction member according to another form. As illustrated in FIG. 14, a restriction member 70A is installed in the door panel lock striker 46. The restriction member 70A is disposed at a predetermined height location of the door panel lock striker 46, and maintains movement of the base 62 in a height direction of the vertical direction of the vehicle body 5, within a predetermined range.

Figure 15:
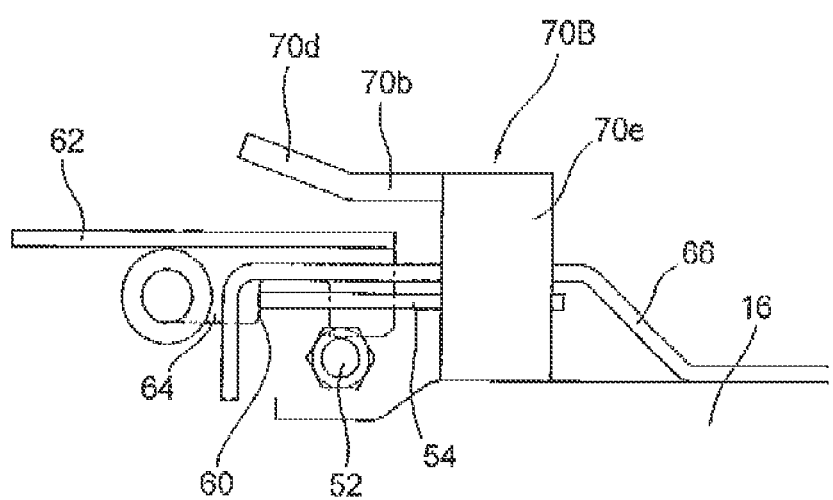
FIG. 15 illustrates a restriction member according to another form.

Further, as illustrated in FIG. 15, a restriction member 70B is installed in the swing door panel 16. A fixing portion in the restriction member 70B is fixed to the swing door panel 16. The fixing portion 70e stands upright from an upper end portion of the swing door panel 16.

Further, although it has been described in the embodiment that the vehicle door structure 10 is applied to one side surface (left side surface) of the vehicle body 5, the vehicle door structure 10 may be installed at a rear surface (backside surface) of the vehicle body 5.

Further, although it has been described in the embodiment that the locking portion 50 is installed at a front upper end portion of the swing door panel 16 and the opening portion 60 is installed in the base 62 to which the upper slide portion 38, the latch 44 or the like is mounted, the present invention is not limited thereto, and the locking portion 50 may be installed at a front lower end portion of the swing door panel 16, and the opening portion 60 may be installed in the base to which the lower slide portion 40, a lower latch or the like is mounted. Further, the locking portion 50 and the opening portion may be installed at both of the upper side and the lower side.

| Reference Signs List | |
|---|---|
| 5: Vehicle body | 26: Rear opening portion |
| 28: First opening | 30: Second opening |
| 14: Slide door panel (first door panel) | |
| 16: Swing door panel (second door panel) | |
| 18: Slide mechanism | |
| 20: Hinge mechanism (swing mechanism) | |
| 22: Lock mechanism | 50, 80: Locking portion |
| 52: Detection pin (contact member) | |
| 54: Swing hook (locking member) | |
| 56: Spring (resilient support member) | |
| 60, 60A, 60B: Opening portion | |
| 70, 70A, 70B: Restriction member | |
| 70d: Guide portion | 82: Protrusion portion |
| 82a: Detection pin (contact member) | |
| 82b: Lock pin (locking member) | |
| 84: Spring (resilient support member) | |

The invention claimed is:

1. A vehicle door structure comprising:
    a first door panel arranged in a first opening portion installed in a vehicle body, to open and close the corresponding first opening portion;
    a second door panel arranged in a second opening portion continuously arranged with the first opening portion side by side, to open and close the corresponding second opening portion;
    a slide mechanism configured to mount the first door panel slidably with respect to the vehicle body and the second door panel, and move the first door panel between a closed position where the first opening portion is closed and an opened position where the first opening portion is fully opened and the first door panel overlaps the second door panel outside of the second door panel at the same time; and
    a swing mechanism configured to support the second door panel swingably with respect to the vehicle body and allow the second door panel to swing when the first door panel is in the opened position,
    wherein the vehicle door structure comprises a bracket fixed to the first door panel and located between the second door panel and the vehicle body when the first door panel is in the opened position,
    a locking mechanism configured to lock the first door panel to the second door panel when the second door panel is opened, and
    the locking mechanism comprises a locking portion installed in the second door panel and protruding toward the bracket fixed to the first door panel when the corresponding second door panel is opened, and a portion to be locked, installed in the bracket fixed to the first door panel and locked by the locking portion when the second door panel is opened, the locking portion protruding toward the bracket fixed to the first door panel and located inside of the second door panel.

2. The vehicle door structure according to claim 1, wherein the locking portion comprises a contact member in contact with the vehicle body at the closed position of the second door panel where the second opening portion is closed by the second door panel,
    a locking member rotatably supported by the second door panel and rotating while interlocking with the contact member, and
    a resilient support member configured to resiliently support the locking member in a direction in which the corresponding locking member rotates, and
    when the contact member is spaced apart from the vehicle body, the locking member protrudes toward the bracket fixed to the first door panel while being rotated.

3. The vehicle door structure according to claim 1, wherein the locking member comprises a protrusion portion configured by a contact member in contact with the vehicle body at the closed position of the second door panel where the second opening portion is closed by the second door panel, and a locking member integrally formed with the contact member and extending in the same direction as that of the contact member at the same time; and
    a resilient support member configured to resiliently support the protrusion portion toward the first door panel,
    wherein when the contact member is spaced apart from the vehicle body, the protrusion portion protrudes toward the bracket fixed to the. first door panel.

4. The vehicle door structure according to claim 2, wherein the portion to be locked corresponds to an opening portion, and has a shape in which an opening thereof is continuously narrowed as the locking member rotates while the locking member enters.

5. The vehicle door structure according to claim 1, wherein a restriction member, configured to restrain movement of the first door panel in a vertical direction of the vehicle body when the corresponding first door panel is in the opened position, is formed in the second door panel.

6. The vehicle door structure according to claim 5, wherein a guide portion configured to correct a height location of the first door panel is installed at a portion of the restriction member where the first door panel is to enter.

* * * * *